US012704186B1

(12) United States Patent
Daniels

(10) Patent No.: US 12,704,186 B1
(45) Date of Patent: Aug. 11, 2026

(54) VALVE ASSEMBLY INCLUDING REMOVABLE CARTRIDGE

(71) Applicant: Clarke Industrial Engineering, Inc., North Kingstown, RI (US)

(72) Inventor: Kyle P. Daniels, North Kingstown, RI (US)

(73) Assignee: Clarke Industrial Engineering, Inc., North Kingstown, RI (US)

( * ) Notice: Subject to any disclaimer, the term of this patent is extended or adjusted under 35 U.S.C. 154(b) by 0 days.

(21) Appl. No.: 19/348,506

(22) Filed: Oct. 2, 2025

(51) Int. Cl.
*F16K 3/03* (2006.01)
*F16K 3/04* (2006.01)
*F16K 27/04* (2006.01)

(52) U.S. Cl.
CPC .................. *F16K 3/03* (2013.01); *F16K 3/04* (2013.01); *F16K 27/045* (2013.01); *F16K 2200/501* (2021.08)

(58) Field of Classification Search
CPC . F16K 3/03; F16K 3/04; F16K 27/045; F16K 2200/501
See application file for complete search history.

(56) References Cited

U.S. PATENT DOCUMENTS 2,307,273 A 1/1943 Hughes
2,830,617 A * 4/1958 Brown ..................... F16K 3/03 251/266
3,101,736 A * 8/1963 Egger ..................... F16K 3/03 251/212
3,329,396 A 7/1967 Heaton
3,787,022 A * 1/1974 Wilcox ..................... F16K 3/03 251/212
4,253,487 A * 3/1981 Worley ................... F16K 3/029 251/212
4,513,948 A 4/1985 Konig
5,389,081 A * 2/1995 Castro ................ A61B 17/3462 604/167.03
6,375,155 B1 4/2002 Janssens
7,819,728 B2 10/2010 Beckley
8,132,783 B2 * 3/2012 Luebbers ................. F16K 3/03 138/45
8,196,610 B2 6/2012 Murakami
8,215,613 B2 7/2012 Cheung
8,733,733 B2 5/2014 Collison
8,833,388 B2 9/2014 Eto
8,910,920 B1 12/2014 Daniels
9,217,389 B1 12/2015 Lee
9,568,111 B2 2/2017 Daniels
10,508,743 B2 12/2019 Wakayama
(Continued)

*Primary Examiner* — Patrick C Williams
(74) *Attorney, Agent, or Firm* — Bradley Arant Boult Cummings LLP; Daniel E. Sineway, Esq.

(57) ABSTRACT

The disclosed technology relates to systems and methods for removably inserting a valve cartridge into a valve body of a valve assembly. The valve cartridge can include a housing and a dilating disk valve at least partially disposed within the housing. The valve body can include a cartridge recess extending into a fluid passageway that extends between an inlet and an outlet of the valve body, and the cartridge recess can at least partially receive the valve cartridge such that the dilating disk valve is aligned with the fluid passageway. The valve assembly can include a bonnet configured to detachably attach to the valve body and at least partially cover the valve cartridge.

19 Claims, 9 Drawing Sheets

(56) References Cited

U.S. PATENT DOCUMENTS

| | | | | |
|---|---|---|---|---|
| 10,876,638 | B2 | 12/2020 | Moens | |
| 11,946,557 | B2 | 4/2024 | Shorback | |
| 2005/0269545 | A1 | 12/2005 | Chiba | |
| 2006/0261303 | A1 | 11/2006 | Thomas | |
| 2012/0204998 | A1* | 8/2012 | Brimson | B65B 69/0075 251/156 |
| 2015/0041695 | A1* | 2/2015 | Daniels | F16K 3/03 251/212 |
| 2017/0356553 | A1* | 12/2017 | Cassel | F16K 37/0008 |

* cited by examiner

VALVE ASSEMBLY INCLUDING REMOVABLE CARTRIDGE

BACKGROUND

In fluid control systems, valves are a vital component for facilitating the amount of fluid or other material flowing through a particular passageway. Commonly, valves include a closing mechanism to block an aperture through which fluid moves. The closing mechanism can include one or more obstructions, such as an obturator or petal, which can selectively move into the path of the fluid flow to block fluid movement through the aperture. In this way, the petals combined with other mechanical components of the valve can control fluid movement through passageways fluidly connected to the valve. Stated otherwise, the valve can selectively permit fluid flow through a corresponding fluid transportation system.

However, certain sealing materials are limited by their properties, which can restrict their usefulness in certain applications. For example, one or more of the petals, sealing material installed on the petals, and/or other valve components (e.g., sealing materials or components, such as gaskets or O-rings) can erode, corrode, melt, or otherwise degrade, particularly when corrosive or high temperature fluids pass, as a non-limiting example. Commonly, a failing or degraded component can typically be repaired or replaced, but to do so, the entire valve assembly must be removed from the fluid transportation system in order to repair or replace the petal(s) having worn, degraded, or missing sealing material. Thus, the petal repair/replacement process can be cumbersome and time-consuming. Further, the downtime for the corresponding fluid transportation system can be costly.

Therefore, there is a long-felt but unresolved need for an apparatus or system that can provide valve functionality (e.g., selectively permitting or preventing fluid flow through a fluid transportation system) while enabling easy removal of the valve's internal components from the fluid transportation system for repair or replacement, particularly without removing the entire apparatus or system.

SUMMARY

Briefly described, the disclosed technology generally relates to apparatuses, systems, and methods for removably installing a valve cartridge into a valve body. As will be described more fully herein, the valve cartridge can be quickly and easily accessed and removed from, or installed in, the valve body, and the valve cartridge can include a dilating disk valve. Additional aspects and benefits of the technology are discussed herein.

This disclosed technology includes a valve assembly comprising a valve cartridge, a valve body, and a bonnet. The valve cartridge can comprise a housing and a dilating disk valve that is at least partially disposed within the housing. The valve body can comprise an inlet, an outlet, and a fluid passageway extending therebetween. The valve body can comprise a cartridge recess extending into the fluid passageway at a location between the inlet and the outlet, and the cartridge recess can be configured to at least partially receive the valve cartridge. The dilating disk valve can be aligned with the fluid passageway when the valve cartridge is installed in the cartridge recess. The bonnet can be configured to detachably attach to the valve body and at least partially cover the valve cartridge when the bonnet is attached to the valve body.

The dilating disk valve can comprise a gear mechanism comprising a rotating ring and a plurality of obturator elements. Each of the plurality of obturator elements can comprise a top side having a substantially convex curvature, a bottom side having a substantially concave curvature, and a sidewall comprising a control aperture and a hinge aperture.

Each of the plurality of obturator elements can comprise a tongue-and-groove feature.

Each of the plurality of obturator elements can be in mechanical communication with the rotating ring via one or more linkages. The one or more linkages can comprise a controlling pin and a controlling arm.

Each of the plurality of obturator elements can be prevented from translationally moving by a hinge pin extending through the corresponding hinge aperture.

The valve cartridge can further comprise a shaft. The shaft can have a first end extending from the housing of the valve cartridge and a second end disposed within the housing. The second end of the shaft can comprise first gear teeth configured to mate with second gear teeth of the rotating ring.

The valve assembly can comprise a motor in mechanical communication with the first end of the shaft.

The fluid passageway can have a first central axis and the cartridge recess has a second central axis that intersects the first central axis. The second central axis can be approximately perpendicular to the first central axis.

The valve body can further comprise a cartridge housing comprising the cartridge recess, a first body portion extending between the inlet and the cartridge housing, and a second body portion extending between cartridge housing and the outlet.

The diameter of the fluid passageway can be substantially constant along a first length of the first body portion and a second length of the second body portion. Alternatively, the diameter of the fluid passageway can change along the first length of the first body portion or the second length of the second body portion. Alternatively or in addition, the diameter of the fluid passageway can gradually decrease along the first length and can gradually increases along the second length when moving in a directed extending from the inlet to the outlet.

The disclosed technology includes a valve cartridge comprising a housing and a dilating disk valve at least partially disposed within the housing. The dilating disk valve can comprise a gear mechanism comprising a rotating ring, and the dilating disk valve can comprise a plurality of obturator elements. Each of the plurality of obturator elements can comprise a top side having a substantially convex curvature, a bottom side having a substantially concave curvature, and a sidewall comprising a control aperture and a hinge aperture. The housing can be configured to removably insert into a cartridge recess of a valve body.

Each of the plurality of obturator elements can comprise comprises a tongue-and-groove feature.

Each of the plurality of obturator elements can be in mechanical communication with the rotating ring via one or more linkages. The one or more linkages can comprise a controlling pin and a controlling arm.

Each of the plurality of obturator elements can be prevented from translationally moving by a hinge pin extending through the corresponding hinge aperture.

The valve cartridge can further comprise a shaft, and the shaft can have a first end extending from the housing of the valve cartridge and a second end disposed within the housing. The second end of the shaft can comprise first gear teeth configured to mate with second gear teeth of the rotating ring.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. The embodiments illustrated herein are presently preferred, it being understood, however, that the invention is not limited to the precise arrangements and instrumentalities shown, wherein.

DETAILED DESCRIPTION

Figure 1:
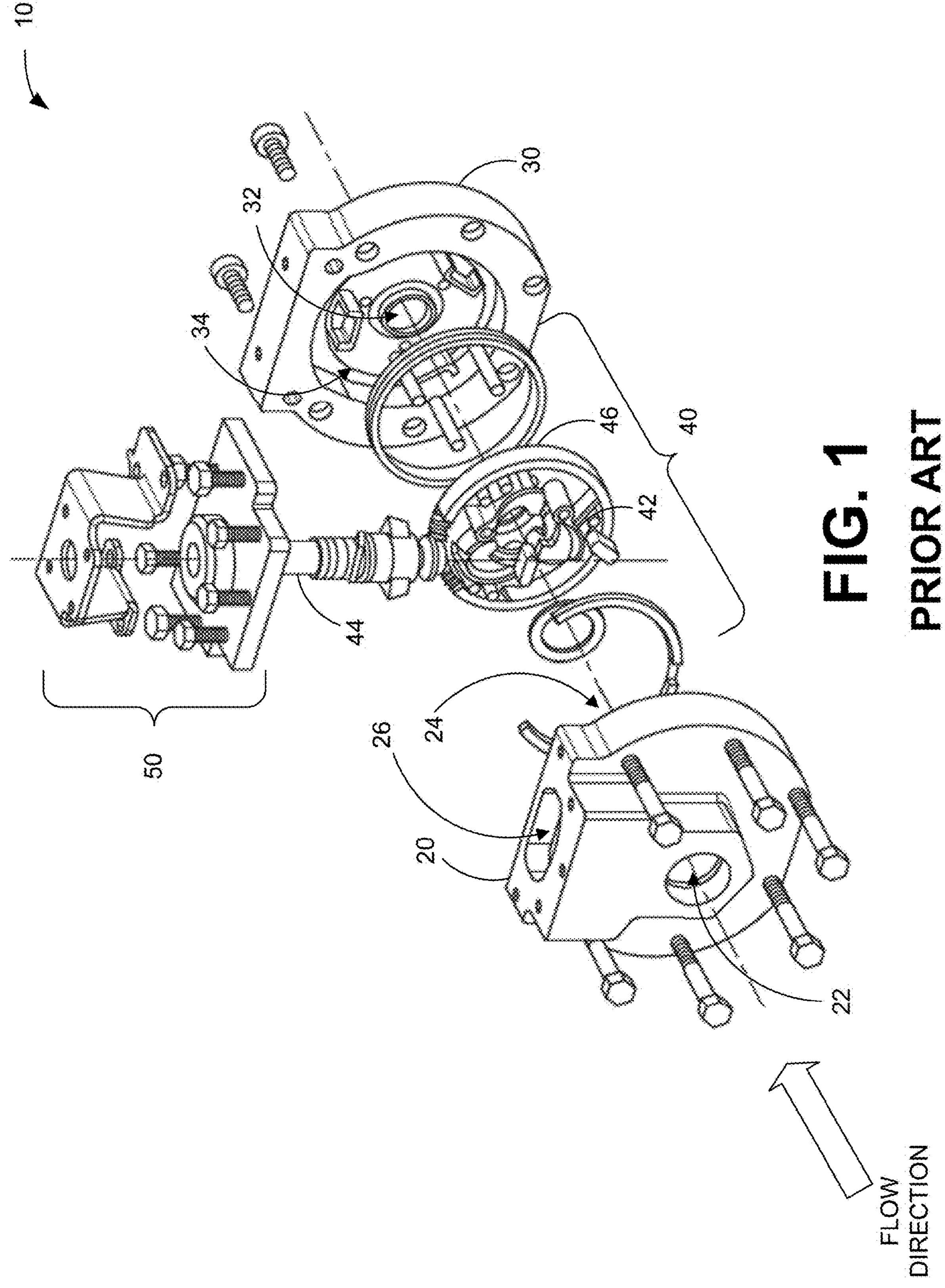
FIG. 1 illustrates a prior art valve assembly.

Although certain examples of the disclosed technology are explained in detail herein, it is to be understood that other examples, embodiments, and implementations of the disclosed technology are contemplated. Accordingly, it is not intended that the disclosed technology is limited in its scope to the details of construction and arrangement of components expressly set forth in the following description or illustrated in the drawings. The disclosed technology can be implemented in a variety of examples and can be practiced or carried out in various ways.

Whether or not a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

It should also be noted that, as used in the specification and the appended claims, the singular forms “a,” “an,” and “the” include plural references unless the context clearly dictates otherwise. References to a composition containing “a” constituent is intended to include other constituents in addition to the one named.

Ranges may be expressed herein as from “about” or “approximately” or “substantially” one particular value and/or to “about” or “approximately” or “substantially” another particular value. When such a range is expressed, the various examples of the disclosed technology includes from the one particular value and/or to the other particular value. Further, ranges described as being between a first value and a second value are inclusive of the first and second values. Likewise, ranges described as being from a first value and to a second value are inclusive of the first and second values.

Herein, the use of terms such as “having,” “has,” “including,” or “includes” are open-ended and are intended to have the same meaning as terms such as “comprising” or “comprises” and not preclude the presence of other structure, material, or acts. Similarly, though the use of terms such as “can” or “may” are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term “step” can be used herein to connote different aspects of methods employed, the term should not be interpreted as implying any particular order among or between various steps herein disclosed unless and except when the order of individual steps is explicitly required. Further, the disclosed technology does not necessarily require all steps included in the example methods and processes described herein. That is, the disclosed technology includes methods that omit one or more steps expressly discussed with respect to the examples provided herein.

Further, the disclosed technology contemplates performance of various method steps and operations in whole, in part, or in combination by a user and/or a computing device or system. For example, the disclosed technology can include a computing device comprising one or more processors and memory having instructions stored thereon that, when executed by the one or more processors, causes the computing device to perform one or more steps or operations, such as one, some, or all of the method steps discussed herein (expressly or impliedly). Alternatively or in addition, the disclosed technology can include input from, or performance by, a user for performance of one, some, or all of the method steps discussed herein (expressly or impliedly).

Also, in describing the examples, terminology will be resorted to for the sake of clarity. It is intended that each term contemplates its broadest meaning as understood by those skilled in the art and includes all technical equivalents, which can operate in a similar manner to accomplish a similar purpose.

The components described hereinafter as making up various elements of the disclosed technology are intended to be illustrative and not restrictive. Many suitable components that would perform the same or similar functions as the components described herein are intended to be embraced within the scope of the disclosed technology. Such other components not described herein can include, but are not limited to, for example, similar components that are developed after development of the presently disclosed subject matter.

For the purpose of promoting an understanding of the principles of the present disclosure, reference will now be made to the embodiments illustrated in the drawings and specific language will be used to describe the same. Nevertheless, it will be understood that no limitation of the scope of the disclosure is thereby intended; any alterations and further modifications of the described or illustrated examples or embodiments, and any further applications of the principles of the disclosure as illustrated therein are contemplated as would normally occur to one skilled in the art to which the disclosure relates. All limitations of scope should be determined in accordance with and as expressed in the claims.

Overview

Aspects of the present disclosure generally relate to systems and methods for flow management of a substance or material (e.g., a fluid) through a passageway of a fluid transportation system. Referring to FIG. 1, an example existing valve assembly 10 is illustrated. The valve assembly 10 can include a housing that includes a first housing portion 20 and a second housing portion 30. The first housing portion 20 can include a first aperture 22 (e.g., an inlet) having a central axis extending in the flow direction. Similarly, the second housing portion 30 can include a second aperture 32 (e.g., an outlet) having a central axis extending in the direction of flow. The first aperture 22 can fluidly and/or mechanically connect to first tubing of the fluid transport system (e.g., to receive fluid), and the second aperture 32 can fluidly and/or mechanically connect to second tubing of the fluid transport system (e.g., to output fluid).

One or both of the first housing portion 20 and the second housing portion 30 can include a recess 24, 34, which, singly or in combination, can define an interior volume of the housing. The valve assembly 10 can include various valve components 40, such as obturators or petals 42, a shaft 44, a rotating ring 46 configured to mechanically communicate with the shaft and transfer rotational energy to the petals 42, and/or one or more gaskets, O-rings, seals, or the like, as non-limiting examples. The each of the valve components 40 can be located within the interior volume of the housing, in whole or in part. For example, the entirety of the petals 42 and the rotating ring 46 can be located within the interior volume of the housing. As another example, a portion of the shaft 44 (e.g., the end of the shaft 44 that includes gears or threads) can be located within the interior volume of the housing, while another portion of the shaft 44 (e.g., the opposite end of the shaft 44) can extends outside of the housing. More specifically, the housing (e.g., the first housing portion 20) can include a shaft aperture 26 having a central axis that intersects (e.g., is substantially perpendicular to) the flow direction. The shaft aperture 26 can permit the shaft 44 to communicate mechanical energy from an external driving force to the rotating ring 46, which is located within the interior volume of the housing. The valve assembly can further include a bonnet 50, which can attach to the housing. The bonnet 50 can cover and/or the shaft aperture 26 (e.g., to prevent fluid flowing through or into the valve assembly from escaping via the shaft aperture 26).

Notably, as discussed elsewhere herein, existing valve designs, such as valve assembly 10, typically require the entire valve assembly to be removed from the fluid transportation system (e.g., disconnected from the first tubing and the second tubing) for any failing or degraded components to be repaired or replaced. This can be cumbersome and time-consuming and/or can be costly due at least to downtime associated with removing the malfunctioning valve assembly and installing a functional valve assembly (or repairing the malfunctioning valve assembly and reinstalling the same, now-repaired valve assembly).

To address these and other concerns, the disclosed technology includes a valve assembly that includes a valve body having a flow path or passageway extending therethrough, the valve body can include a cartridge recess intersecting, and in fluid communication with the passageway. The valve assembly can include a valve cartridge, which can at least partially insert into the cartridge recess, and the valve assembly can include a bonnet for covering and retaining the valve cartridge. Thus, the valve cartridge can be placed directly in the passageway extending through the valve body. The valve cartridge can include a valve (e.g., a dilating disk valve). When the valve is in a closed configuration, the valve cartridge can obstruct or prevent fluid from flowing through the valve assembly 200. When the valve is in an open configuration, the valve cartridge can permit fluid to flow through the valve assembly 200.

Moreover, the valve cartridge can be quickly and easily accessed by simply removing the bonnet from the valve body. Thus, the valve can be quickly replaced with a different valve by removing the current valve cartridge from the valve assembly and replacing it with a different valve cartridge. The bonnet can then be replaced, and the valve assembly (as well as the fluid transportation system) can be returned to service.

As described more fully herein, the valve cartridge can include two or more obturators or petals. Throughout this disclosure, the terms "obturator," "valve petal," and "petal" are used interchangeably. An obturator or valve petal can be a device that manages the flow of a substance through a passageway or aperture. When in a closed configuration, the petals can abut one another and a portion of the valve cartridge housing or another surface to create one or more seals and obstruct or prevent fluid from flowing therethrough.

The valve petal can include a hinge aperture. The valve petal can be coupled to a frame at the hinge aperture and can pivot about the hinge aperture. The valve petal can include a control aperture. The valve petal can be affixed to a control mechanism at or via the control aperture. The control mechanism can move the valve petal between a first position and a second position via the control aperture. The first position can be an open position that freely allows fluid flow through a fluid aperture. The second position can be a closed position that prevents fluid from flying through the fluid aperture. The valve petal can be connected to a gear mechanism via the control aperture, and the valve petal can connect to a hinge pin at or via the hinge aperture. The gear mechanism can rotate the valve petal about the hinge pin into an opened or closed state. In an at least two valve petal system, the valve petals can perform the closing procedure to facilitate sealing the valve. As will be appreciated, sealing the valve can stop the flow of substances through the particular passageway.

The valve can include at least two valve petals. The valve can include a rotating mechanism (e.g., a gear mechanism) that operatively opens or closes the valve petals. The valve can include three valve petals, for example, where each valve petal forms one-third of the closed valve surface. Regardless, the valve can connect to a passageway system to control the flow of a particular substance or material. For example, the valve can be connected between two portions of a pipe to control the flow of fluid, such as, for example, the flow of liquid nitrogen in a factory.

EXAMPLE EMBODIMENTS

Figure 2:
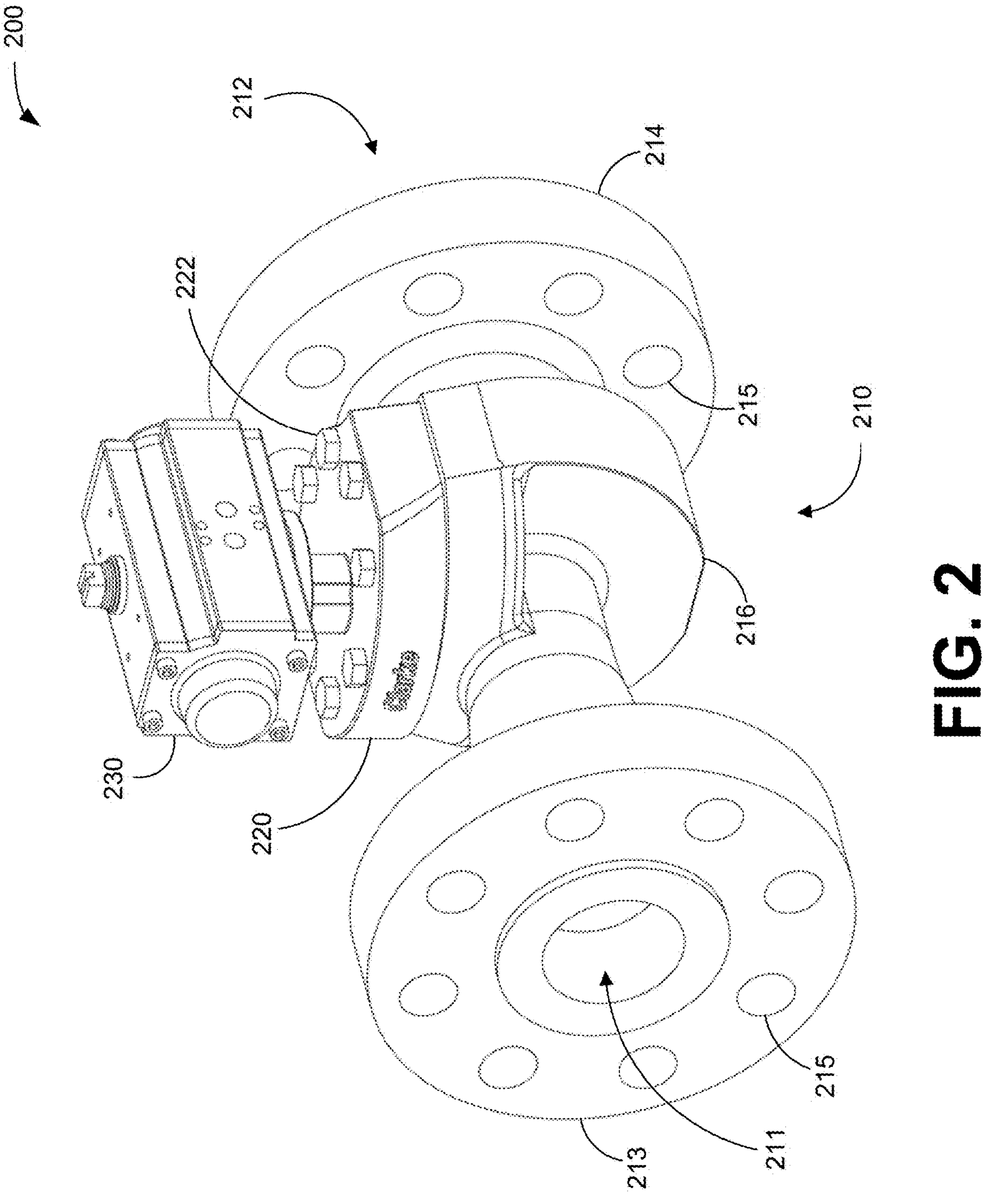
FIG. 2 illustrates a perspective view of an example valve assembly, in accordance with the disclosed technology.

Referring now to FIG. 2, the disclosed technology includes a valve assembly 200 having a valve body 210 and a bonnet 220. The valve assembly 200 can further include a motor 230 for controlling operation of the valve (i.e., opening or closing the valve). The valve assembly 200 can be included in, or incorporated into, a fluid transportation system, which can include various tubes, pipes, conduit, or the like.

The valve body 210 can include a first aperture 211 (e.g., an inlet or outlet) and a second aperture 212 (e.g., an outlet or inlet). When the valve of the valve assembly 200 is open, the first aperture 211 and the second aperture 212 can be in fluid communication. The valve body 210 can include a first flange 213 proximate the first aperture 211, and a second flange 214 proximate the second aperture 212. For example, the first aperture 211 can extend through the first flange 213, and the second aperture 212 can extend through the second flange 214. The first and second flanges 213, 214 can include holes (or recesses, such as threaded recesses) for mechanically attaching tubes, pipes, or other fittings to the valve body 210. The valve body 210 can include a valve housing 216 located between the first aperture and the second aperture 212. The valve body 210 can be composed of, or comprise, steel, titanium, aluminum, or any other metal compound. The valve body 210 can be made from a single piece of material. Alternatively, the valve body 210 can comprise multiple pieces of material that are attached together to form the valve body 210.

Similarly, the bonnet 220 can be composed of, or comprise, steel, titanium, aluminum, or any other metal compound. The bonnet 220 can attach to the valve body 210 via one or more attachment devices, such as the illustrated bolts 222. As described more fully herein, the valve body 210 and the bonnet 220 can house various operational components of the valve (e.g., components that can move to open or close the valve).

Figure 3:
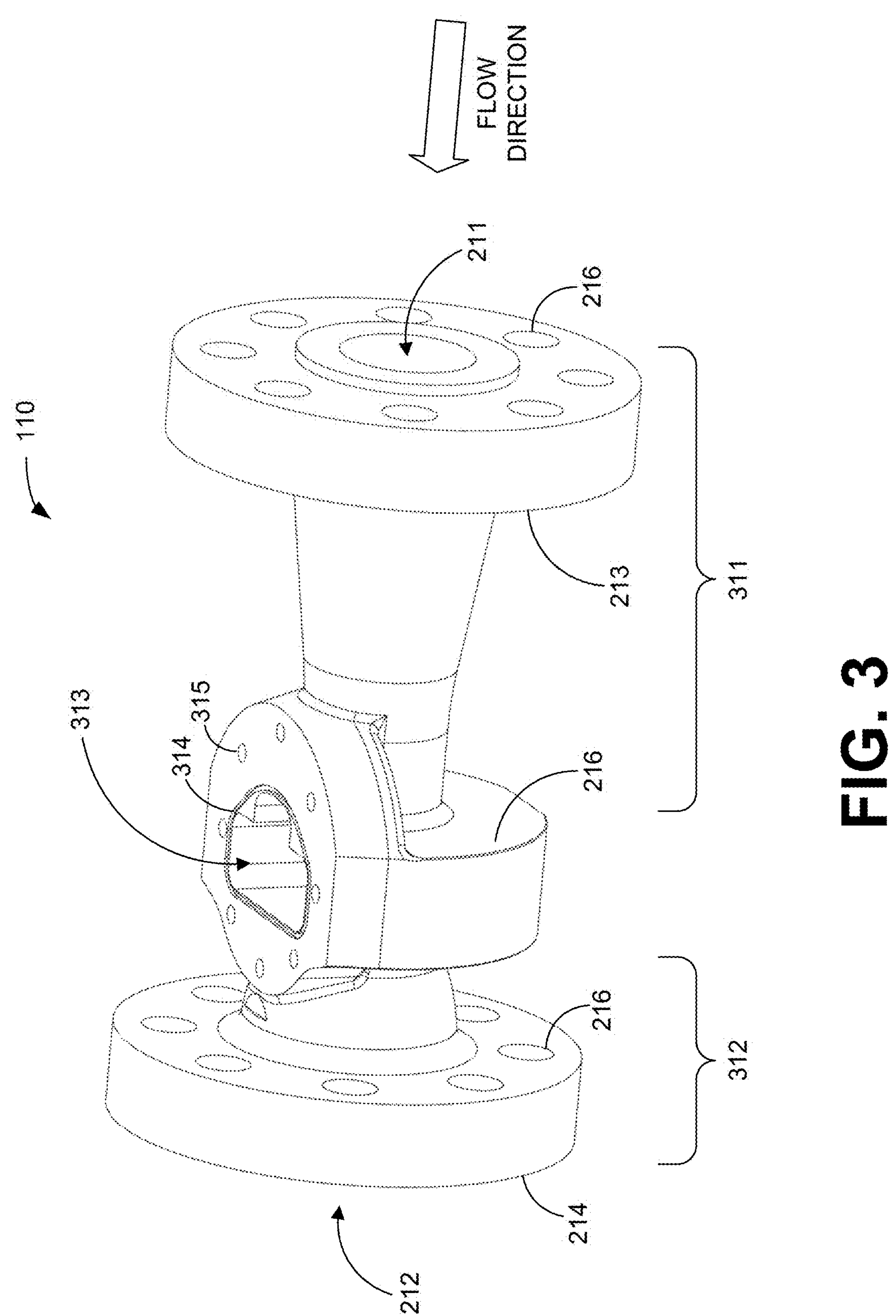
FIG. 3 illustrates a perspective view of an example valve assembly body, in accordance with the disclosed technology.

Referring now to FIG. 3, the valve body 210 can include a first portion 311 located on a first side of the valve housing 216 (e.g., upstream from the valve housing 216 relative the flow direction) and a second portion 312 located on a second side (e.g., opposite the first side) of the valve housing 216 (e.g., downstream from the valve housing 216 relative the flow direction). The valve body 210 can include a cartridge recess 313, which can be configured to at least partially receive a valve cartridge, as described more fully herein. The cartridge recess 313 can be in fluid communication with the first aperture 211 and the second aperture 212. That is to say, a first passageway can extend within the first portion 311 between the first aperture 211 and the cartridge recess 313, and a second passageway can extend within the second portion 312 between the second aperture 212 and the cartridge recess 313.

The cartridge recess 313 can extend into the valve housing 216 from a top surface of the valve housing 216. Stated otherwise, the cartridge recess 313 can have a central axis that intersects the flow direction. For example, the central axis of the cartridge recess 313 can be substantially perpendicular to the flow direction. The top surface can include a seal recess 314 extending around the perimeter of the cartridge recess 313, which can be configured to at least partially receive a seal (e.g., an O-ring) to help form a fluid-tight connection between the valve body 210 and the bonnet 220. The valve body 210 (e.g., the top surface of the valve housing 216) can include one or more threaded recesses 315 for receiving threaded bolts 222 to attach the bonnet 220 to the valve body 210.

The first passageway can be longer than the second passage, as illustrated. Alternatively, the first and second passages can have the same length, or the second passageway can be longer than the first passage. The diameter of the first passageway can be substantially constant along the length of the first passageway, and/or the diameter of the second passageway can be substantially constant along the length of the second passageway. Alternatively or in addition, the diameter of the first passageway can change along the length of the first passageway, and/or the diameter of the second passageway can change along the length of the second passageway. For example, the diameter of the first passageway can gradually decrease when moving from the first aperture 211 toward the cartridge recess 313, and the diameter of the second passageway can gradually increase when moving from the cartridge recess 313 to the second aperture 212, substantially forming a venturi tube structure. As additional examples, the diameter of the first passageway can gradually increase when moving from the first aperture 211 toward the cartridge recess 313, and/or the diameter of the second passageway can gradually decrease when moving from the second aperture 212 toward the cartridge recess 313.

Figure 4:
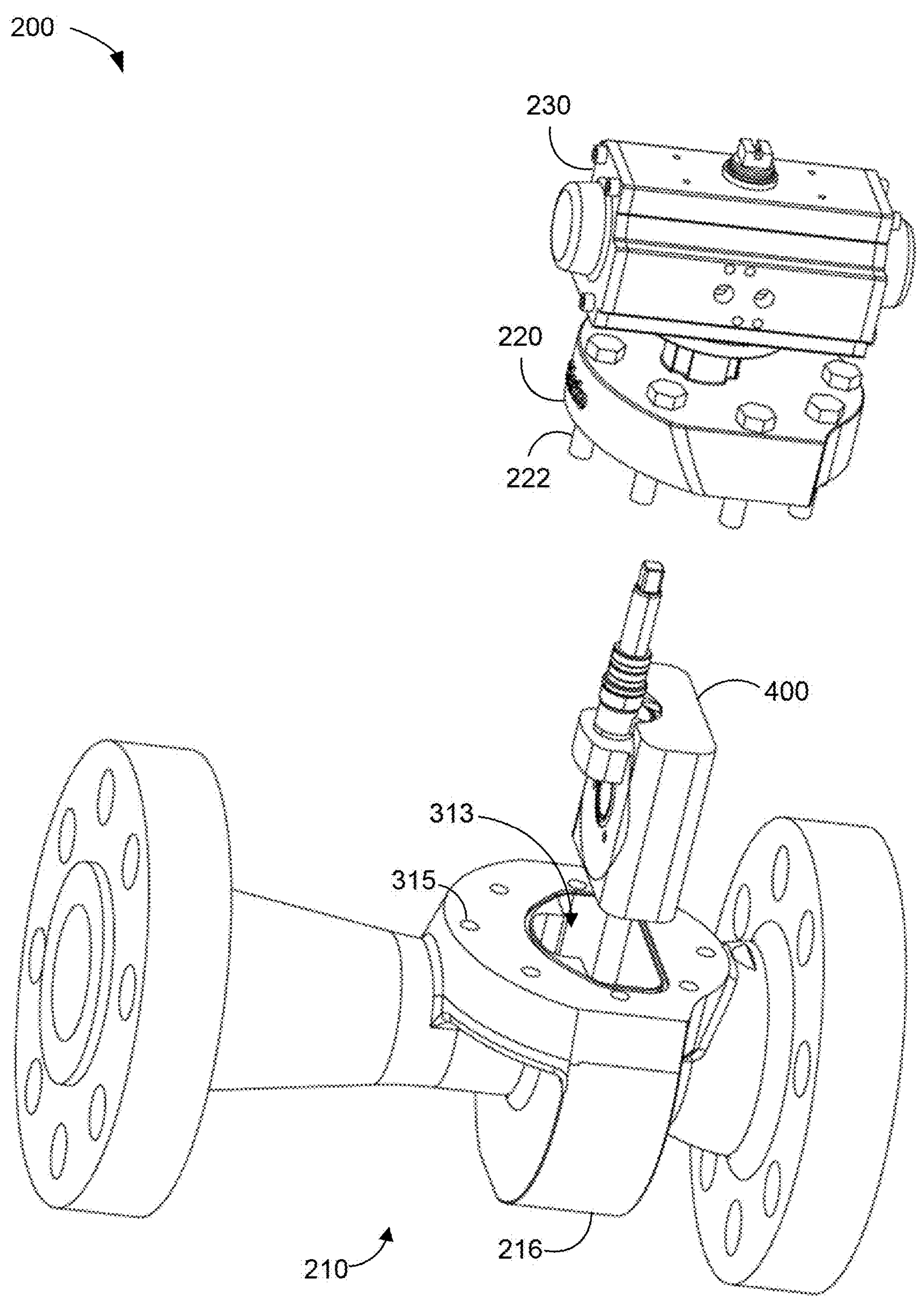
FIG. 4 illustrates an exploded view of an example valve assembly, in accordance with the disclosed technology

As shown perhaps most clearly in FIG. 4, a removable valve cartridge 400 can be at least partially inserted into the cartridge recess 313. Thus, in the event that a valve component fails or degrades, the valve cartridge 400 can be quickly and easily removed and replaced by loosening the bolts 222, removing the bonnet 220 from the valve body 210, and removing the valve cartridge 400 from the valve recess 313 of the valve body 210. A different, fully functional valve cartridge 400 can then be at least partially inserted into the valve recess 313, the bonnet 220 can be placed onto the valve body 210, and the bolts 222 can be re-tightened to secure the bonnet 220 to the valve body 210. Accordingly, the duration of downtime for the fluid transportation system can be drastically reduced, which decreases the cost associated with repairing or replacing a failing or degraded valve. Further, the ease of repair or replacement of a failing or degraded valve is greatly increased.

Figure 5A:
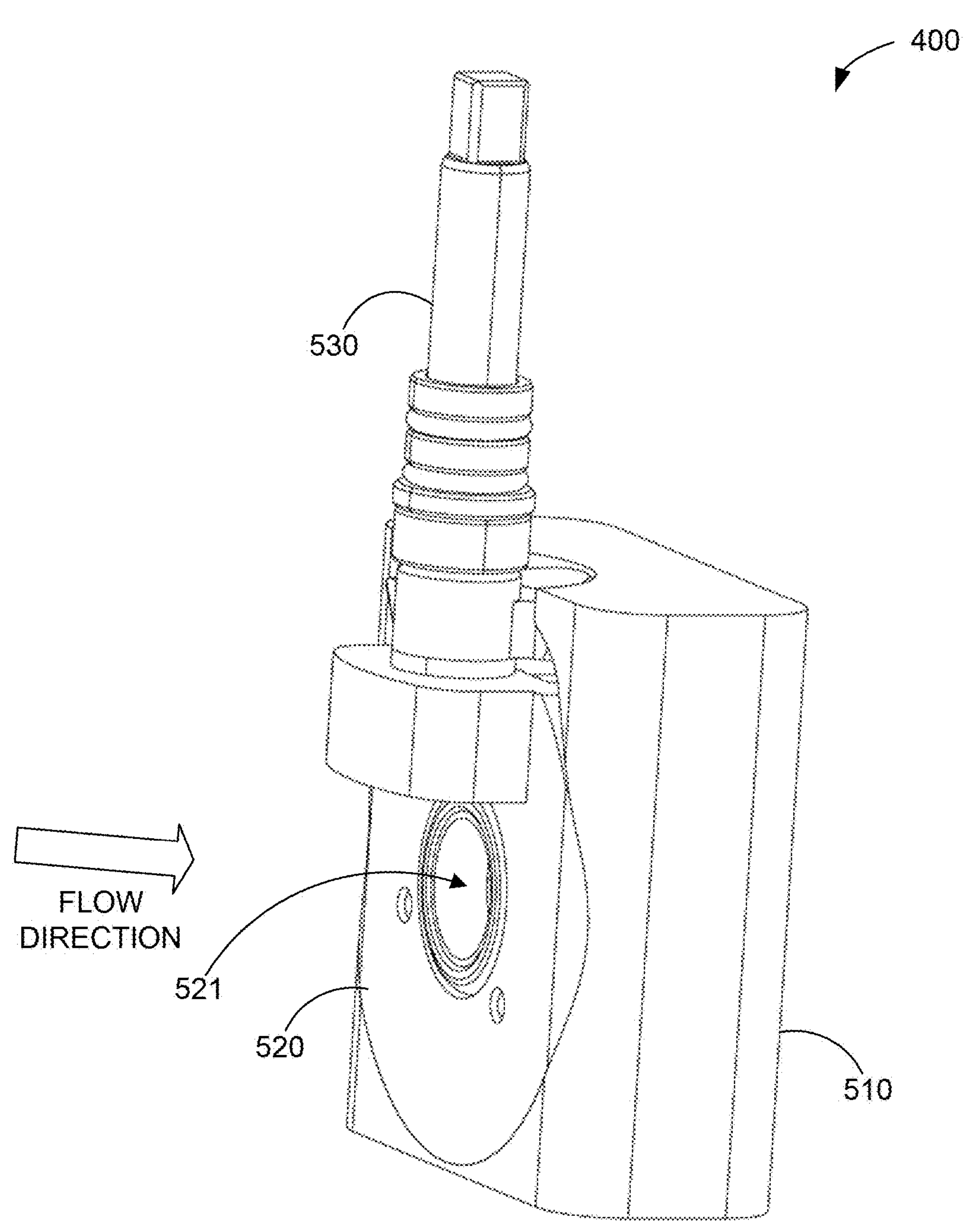
FIG. 5A illustrates a perspective view of an example valve cartridge, in accordance with the disclosed technology.
Figure 5B:
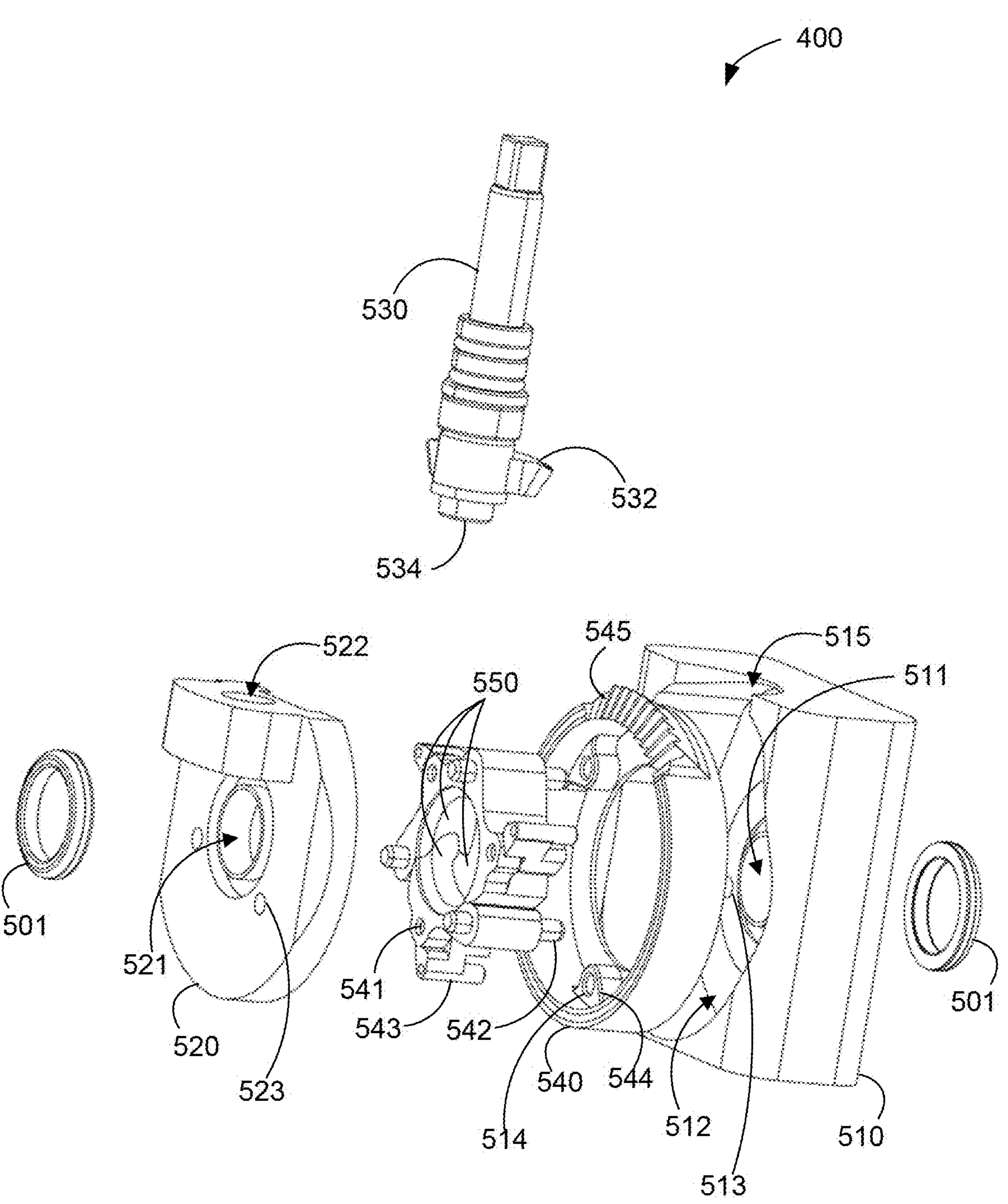
FIG. 5B illustrates an exploded view of an example valve cartridge, in accordance with the disclosed technology.

Turning now to FIGS. 5A and 5B, the valve cartridge 400 can include a first housing portion 510 (e.g., a base portion) and a second housing portion 520 (e.g., a cover or face portion). The first housing portion 510 can have a first aperture 511, and the second housing portion 520 can have a second aperture 521. The first and second apertures 511, 521 can be approximately axially aligned. Further, the first and second apertures 511, 521 can be approximately axially aligned with the first and second passageways of the valve body 210 when the valve cartridge 400 is installed in the valve body 210.

Figure 5C:
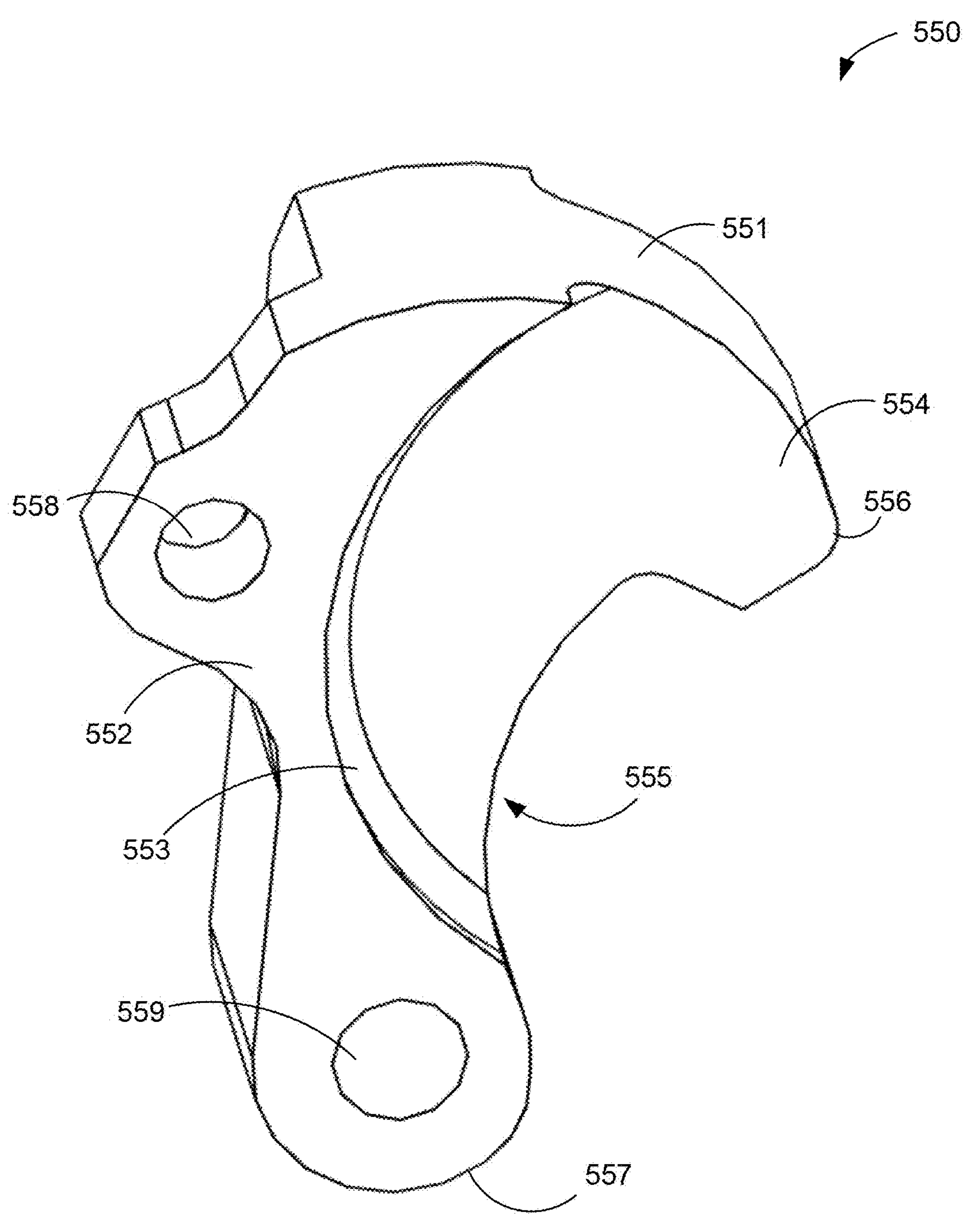
FIG. 5C illustrates a perspective view of an example valve petal of a valve cartridge, in accordance with the disclosed technology.

The first housing portion 510 can have a recess 512 having a central axis extending in the flow direction. The recess 512 can be configured to at least partially receive various valve components, such as dilating disk valve components, as a non-limiting example. For example, the valve cartridge 400 can include two or more petals 550, such as the three petals 550 illustrated in FIGS. 5A and 5B. Referring to FIG. 5C, a given petal 550 can include a top surface 551, an outer side surface 552, a curved surface 553, an inner side surface 554, and a bottom surface 555. The top surface 551 can be curved. The top surface 551 can extend continuously from a beveled edge 556 to the bottom surface 555.

The outer side surface 552 can be confined by the top surface 551, the bottom surface 555, and/or the curved surface 553. Stated otherwise, the outer side surface 552 can have edges or boundaries at least partially bounded partially by the top surface 551, the bottom surface 555, and/or the curved surface 553 (or another surface of the recessed portion, as described more fully herein). The outer side surface 552 can be substantially planar and can exhibit no curved or undulating areas.

The outer side surface 552 can include a control aperture 558 and a hinge aperture 559. The control aperture 558 can be configured to at least partially receive a controlling pin 541 (see, e.g., FIG. 5B), and the hinge aperture 559 can be configured to at least partially receive a hinge pin 542. The hinge pin 542 can be substantially statically positioned. For example, the hinge pin 542 can insert into a corresponding first anchoring recess 513 provided on an inner surface (e.g., within the recess 512) of the first housing portion 510, and the anchoring recess 513 can maintain the hinge pin 542—and therefore the hinge aperture 559—in a static position. For added stability, the hinge pin 542 can also insert into a second anchoring recess 523 located in or on the second housing portion 520.

The controlling pin 541 can be dynamically positioned. For example, the controlling pin 541 can attach to the petal 550 by inserting into the control aperture 558, and an opposite end of the controlling pin 541 can be attached to, or integral with, a controlling arm 543, which can be mechanically connected to a rotating ring 540, such as by inserting into a recess of a rotating attachment point 514. As described more fully herein, upon the rotating ring 540 being caused to rotate, the rotational force can be transferred to the petal 550 at the control aperture 558 via the rotating attachment point 514, the controlling arm 543 and the controlling pin 541. As such, the petal 550 can rotate about the hinge aperture 559 as the control aperture 558 is pulled or pushed by a gear mechanism (which can include the rotating ring 540, for example). Such rotation about the hinge aperture 559 can cause the petal 550 to open or close.

As shown in FIG. 5C, the petal 550 can include a recessed portion that is recessed with respect to the outer side surface 552. The recessed portion can include the inner side surface 554. The recessed portion can include the inner side surface 554 and the curved surface 553. When included, the curved surface 553 can provide a smooth transition between the outer side surface 552 and the inner side surface 554. Alternatively, the petal 550 can omit a recessed portion (e.g., including the inner side surface 554 and/or the curved surface 553) and can have a single, substantially planar face defined by the outer side surface 552, as shown in FIG. 5B.

The curved surface 553 can be confined by the outer side surface 552, the inner side surface 554, the top surface 551, and/or the bottom surface 555. Stated otherwise, the curved surface 553 can have edges or boundaries at least partially bounded by the outer side surface 552, the inner side surface 554, the top surface 551, and/or the bottom surface 555. The curved surface 123 can exhibit a substantially consistent/equal curvature or consistent/equal deviation from a straight line. The arc length of the curved surface 123 can be equal to 360 degrees divided by the number of valve petals 200 included in the dilating disk valve assembly. For example, the curved surface 123 can be 120 degrees, equating to one-third of a circle, such that a dilating disk valve assembly including three valve petals 200 can connect to form a complete circle. For example, as the three valve petals 200 close, the curved surface 553 of each petal 550 can connect at each end to form a circle.

The inner side surface 554 can be confined by the top surface 551, the curved surface 553, and/or the bottom surface 555. Stated otherwise, the inner side surface 554 can have edges or boundaries at least partially bounded by the top surface 551, the curved surface 553, and/or the bottom surface 555. The inner side surface 554 can be substantially parallel to the outer side surface 552. The inner side surface 554 can have a substantially planar surface.

The bottom surface 555 can extend from the beveled edge 556 to a rounded edge 207. The bottom surface 555 can have various curves, which can be substantially similar in dimension to the curves of the top surface 551. Two adjacent valve petals 200 can interlock and create a seal at the bottom surface 555 of one petal 550 and the top surface 551 of the other valve petal 200. The top surface 551 and the bottom surface 555 can substantially smooth. Alternatively, the top surface 551 and the bottom surface 555 can include a tongue-and-groove structure (e.g., with a tongue protruding from the top surface 551 and a mating groove recessed into the bottom surface 555) such that the top surface 551 of one petal 550 can interlock with the bottom surface 555 of an adjacent petal 550 when the valve is in the closed configuration.

The dilating disk valve can include a controlling arm 543, a controlling pin 541, and a hinge pin 542. A controlling arm 543 can connect to each petal 550 using the corresponding controlling pin 541. The controlling pin 541 can be an extension of (or a separate component attached or connected to) the controlling arm 543 and can insert into the control aperture 558. The controlling pins 541 can transfer force onto the petals 550 to open or close the dilating disk valve. For example, the controlling arm 543 can be in mechanical communication with gear mechanism, which can rotate clockwise to apply a force to the petals 550 via the controlling pins 541. Continuing this example, as more force is exerted on the petals 550, the petals 550 can begin to rotate in a clockwise direction, ultimately causing the petals 550 to close.

The petals 550 can rotate about the hinge pin 542. The hinge pin 542 can be inserted into the hinge aperture 559 and can be substantially anchored (e.g., static, stationary). The hinge pin 542 can be attached to the frame of the dilating disk valve assembly 100 to anchor the petals 550 to a particular location. Anchoring the petals 550 at the location of the hinge pin 1003 can facilitate the petals 550 rotating about that location. For example, as a force is exerted by the controlling arm 543 in a clockwise direction, the petals 550 are pulled in the clockwise direction. Continuing this example, the petals 550 rotate about the hinge pin 542. Continuing this example, the petals 550 can continue to rotate until all petals 550 have met at the center of the dilating disk valve.

As previously mentioned, the valve cartridge 400 can include a gear mechanism, which can provide the necessary forces to open or close the dilating disk valve. Referring to FIG. 5B, the gear mechanism can include the controlling arm 543 and a controlling base 544. The controlling base 544 can be fixed to the rotating ring 540. The rotating ring 540 can include threads or a gear portion 545. The controlling arm 543 can include a controlling base pin that can connect to the controlling base 544. The controlling base pin can be inserted into a controlling base aperture of the controlling base 544. The controlling base pin can be inserted into the controlling base aperture and rotate freely to pivot around the controlling base aperture. Alternatively, the controlling arm 543 can include an integral pin or other projection extending therefrom, and the integral pin of the controlling arm 543 can be inserted into the controlling base aperture of the controlling arm 543. Regardless, as the controlling base 544 rotates to a closed position, the controlling base 544 moves with the rotating ring 540, by forces received via the annular gear portion 1312, in a first direction (e.g., clockwise or counterclockwise). Continuing this example, as the controlling base 544 moves to the first direction, the controlling base 544 transfers force to the controlling arm 543 and the valve petal 200 in a similar direction. Continuing this example, as the valve petal 200 begins to rotate inwards around the hinge pin 542, the controlling arm 543 rotates about the pin and/or the controlling base aperture, the controlling arm 543 rotating inwardly toward the aperture 1304. Continuing this example and depending on the particular configuration of the dilating disk valve (e.g., the number of petals 550 included), the controlling arm 543 can extend perpendicularly from the controlling base 544 once the petal 550 is in a completely closed configuration. It should be appreciated that the dilating disk valve can transition to a fully closed configuration, to a fully open configuration, and to one or more intermediate, partially open configurations.

The valve cartridge 400 can include a shaft 530, which can be configured to mechanically communicate with the motor 230 at a first end. At a second end opposite the first end, the shaft can include a gear portion 532 that can mesh and/or mate with the gear portion 545 of the rotating ring 540. As such, the shaft 530 can transfer rotational forces from the motor 230 to the petals 550 via the rotating ring 540 and other aspects of the gear mechanism.

The shaft 530 can include a pivot point 534 at its base, and the pivot point 534 can insert into a pivoting recess 522 of the second housing portion 520. Thus, the shaft 530 can be maintained in alignment with the motor 230, and sufficient contact between the gear teeth 532 of the shaft and the gear teeth 545 of the rotating ring 540 can be maintained. To accommodate the shaft 530 and permit easy rotation of the shaft 530, the first housing portion 510 can include a notch 515 extending into the top surface of the first housing portion.

The valve cartridge 400 can include various seals, gaskets, O-rings, and other sealing materials to ensure fluid does not escape the passageway of the valve and/or to prevent the fluid from contact the gear mechanism or otherwise entering the inner workings of the valve cartridge 400. As an illustrative example, the valve cartridge 400 can include gaskets 501 surrounding the first aperture 521 and the second aperture 511, and the gaskets can provide a fluid-tight seal between the corresponding outer surfaces of the first and second housing portions 510, 520 and the corresponding inner surfaces of the cartridge recess 313 of the valve body 210 when the valve cartridge 400 is inserted into the valve body 210.

Figure 6:
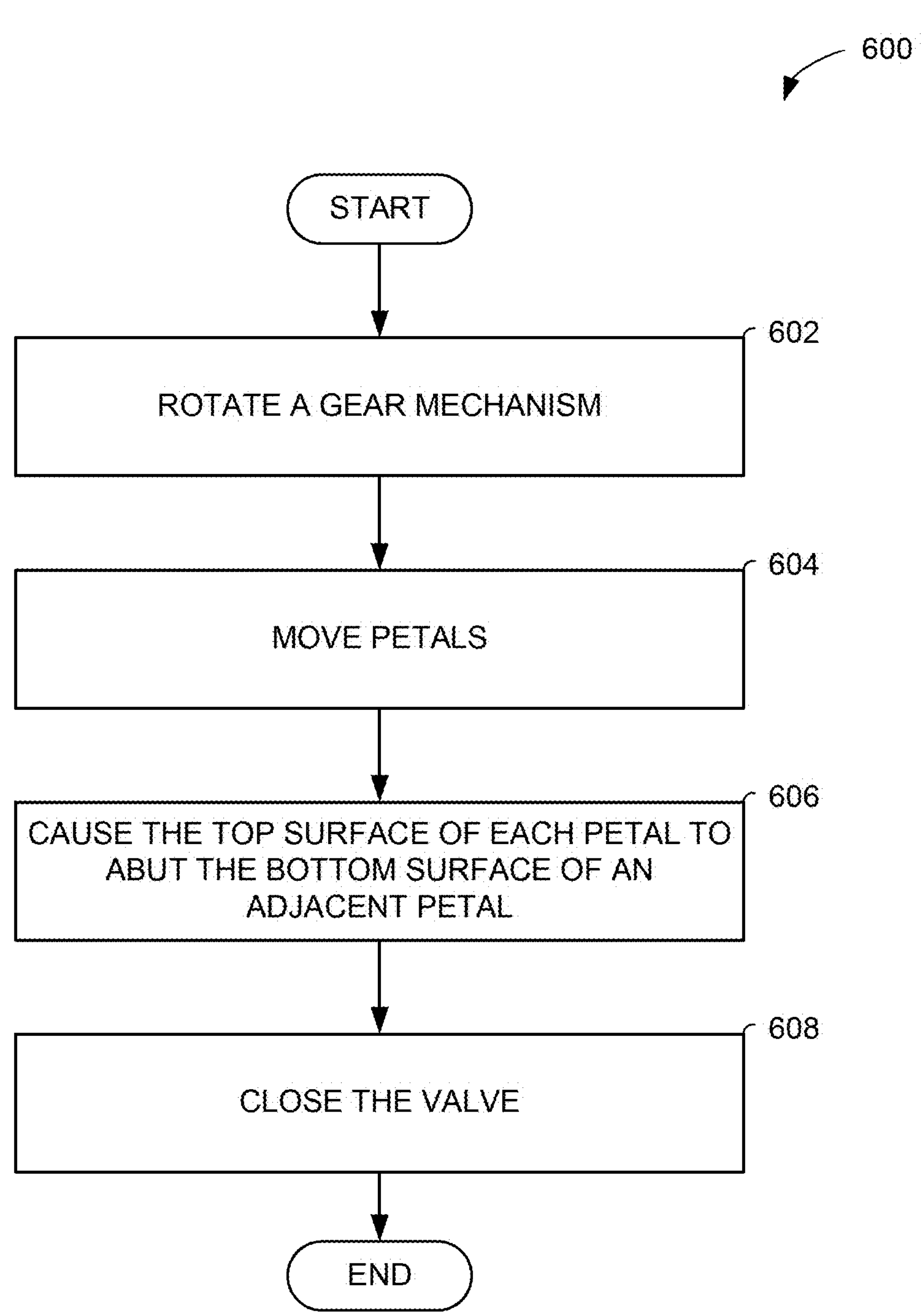
FIG. 6 illustrates a flowchart of an example method for operating a valve cartridge comprising a dilating disk valve, in accordance with the disclosed technology.

Referring now to FIG. 6, a method 600 for operating an example dilating disk valve is disclosed. The method 600 can correspond to the overall functionality of the disclosed system. For example, the method 600 demonstrates operations for closing and sealing a valve for a fluid transportation system.

The method 600 can include rotating 602 a gear mechanism. The gear mechanism can include the rotating ring 540, the gear portion 545, and the shaft 530. The shaft 530 can rotate and apply a pulling or pushing force on the rotating ring 540 (e.g., a rotational force in a first direction or a second direction) via the mechanical communication between the shaft 530 and the gear portion 545. The force produce by the shaft 530 and applied to the gear portion 545 can translate the rotation of the shaft 530 in one direction into the rotation of the rotating ring 540 in the same direction. For example, if the shaft 530 rotates in a counterclockwise direction, the shaft 530 can cause the gear portion 545 and the rotating ring 540 to rotate in a counterclockwise direction. On the other hand, if the shaft 530 rotates in a clockwise direction, the rotating ring 540 can rotate in a clockwise direction.

The method 600 can include moving 604 a plurality of petals 550. As the rotating ring 540 begins to rotate in a particular direction, the plurality of controlling bases 544 follows the same path as the rotating ring 540. For example, if the rotating ring 540 rotates clockwise, the controlling bases 544 rotate clockwise. Each controlling base 544 can mechanically connect to a corresponding controlling arm 543. The petals 550 can each mechanically connect to a corresponding controlling arm 543 and a corresponding hinge pin 542. As the controlling base 544 rotates, the controlling arm 543 pulls the petals 550 in the direction of rotation. As the petals 550 are pulled by the controlling arm 543, the petals 550 can begin to rotate about the fixed hinge pins 542. For example, if the rotating ring 540 rotates in a clockwise direction, the petals 550 can rotate about the hinge pins 542 in a clockwise direction. Continuing this example, the petals 550 can begin to approach a closed or sealed state as they continue to rotate (e.g., in a clockwise direction as illustrated).

The method 600 can include causing 606 the top surface 551 of each petal 550 to abut the bottom surface 555 of an adjacent (e.g., adjacent in the clockwise direction as illustrated) petal 550. As described herein, the surface roughness of the top surfaces 551 and the bottom surfaces 555 can be sufficiently low such that contact between neighboring petals 550 can be fluid-tight or approximately fluid-tight. The method 600 can include closing 608 valve upon causing the top surface of each petal to contact or abut the bottom surface of an adjacent petal.

Thus, the method 600 can include sealing the fluid passageway to restrict fluid and/or material flow. The rotating ring 540 can lock into place after the petals 550 couple together (e.g., abut one another). Locking the rotating ring 540 can facilitate a continued and/or constant seal between the petals 550.

Figure 7:
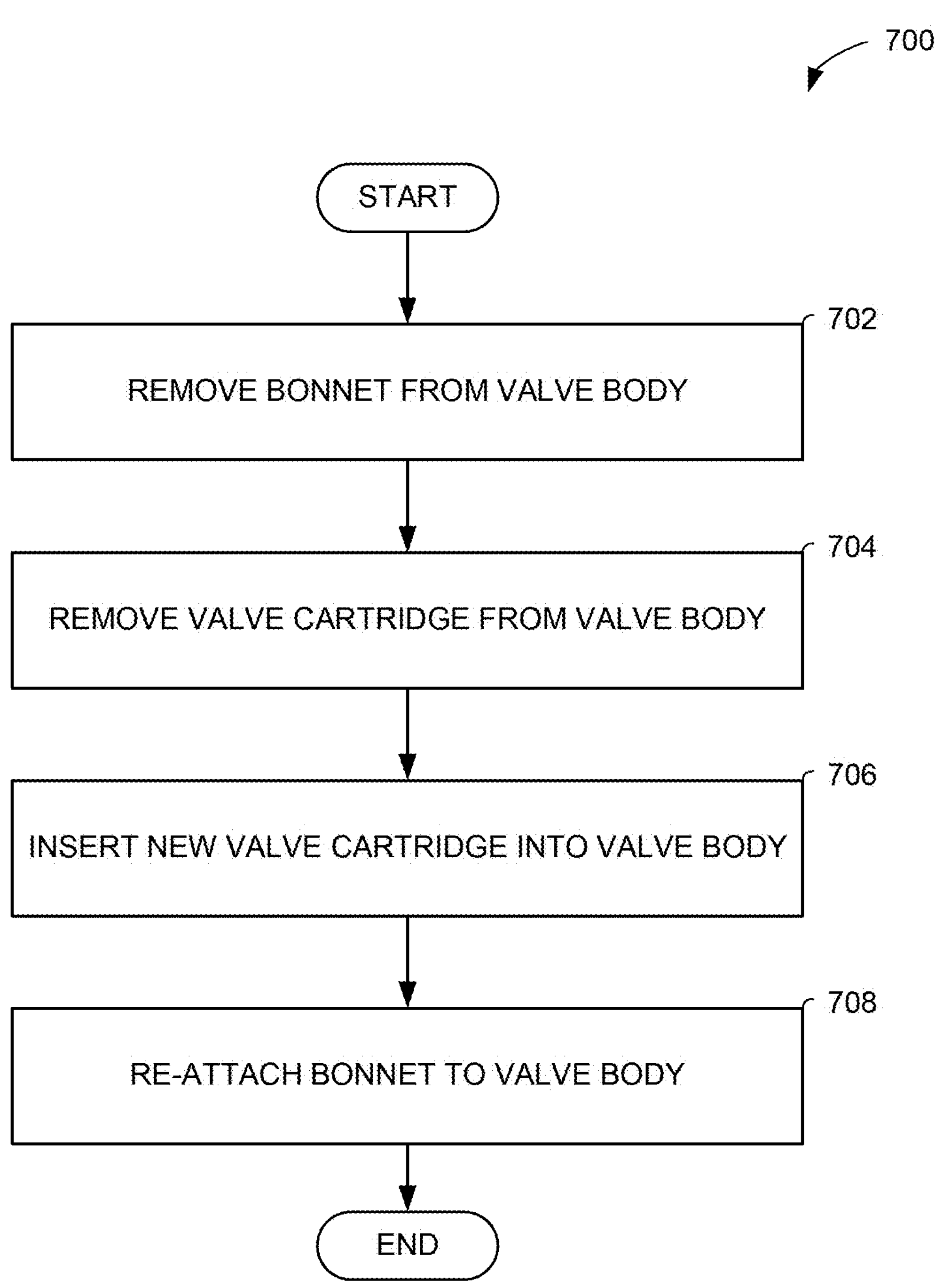
FIG. 7 illustrates a flowchart of an example method for replacing a damaged valve cartridge, in accordance with the disclosed technology.

Now referring to FIG. 7, the disclosed technology includes a method 700 for exchanging a damaged valve cartridge (e.g., valve cartridge 400) for a functional valve cartridge. The method 700 can include removing 702 the bonnet (e.g., bonnet 220) from the valve body (e.g., valve body 210) of the valve assembly (e.g., valve assembly 200). The method 700 can include removing 704 the valve cartridge (e.g., valve cartridge 400) from the valve body (e.g., from the valve recess 313). The method 700 can include inserting 706 a different, functioning valve cartridge into the valve body (e.g., into the valve recess 313). The method 700 can include re-attaching 708 the bonnet to the valve body.

Accordingly, as compared to existing systems, the disclosed technology can drastically reduce the duration of downtime for the fluid transportation system when repairing or replacing a damaged valve. Further, the ease of repair or replacement of a failing or degraded valve is greatly increased.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

Aspects, features, and benefits of the claimed devices and methods for using the same will become apparent from the information disclosed in the exhibits and the other applications as incorporated by reference. Variations and modifications to the disclosed systems and methods may be affected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the example embodiments has been presented only for the purposes of illustration and description and is not intended to be exhaustive or to limit the devices and methods for using the same to the precise forms disclosed. Many modifications and variations are possible in light of the above teaching.

The embodiments were chosen and described in order to explain the principles of the devices and methods for using the same and their practical application so as to enable others skilled in the art to utilize the devices and methods for using the same and various embodiments and with various modifications as are suited to the particular use contemplated. Alternative embodiments will become apparent to those skilled in the art to which the present devices and methods for using the same pertain without departing from their spirit and scope. Accordingly, the scope of the present devices and methods for using the same is defined by the appended claims rather than the foregoing description and the exemplary embodiments described therein.

CONCLUSION

The above-discussed examples were chosen and described in order to explain the principles of the claimed inventions and their practical application so as to enable others skilled in the art to utilize the inventions and various embodiments and with various modifications as are suited to the particular use contemplated. Alternative embodiments will become apparent to those skilled in the art to which the claimed inventions pertain without departing from their spirit and scope. Accordingly, the scope of the claimed inventions is defined by the appended claims rather than the foregoing description and the exemplary embodiments described therein.

What is claimed is:

1. A valve assembly comprising:
a valve cartridge comprising:
a housing; and
a dilating disk valve at least partially disposed within the housing, wherein the dilating disk valve comprises:
a gear mechanism comprising a rotating ring; and
a plurality of obturator elements, each of the plurality of obturator elements comprising:
a top side having a substantially convex curvature;
a bottom side having a substantially concave curvature; and
a sidewall comprising a control aperture and a hinge aperture;
a valve body comprising:
an inlet, an outlet, and a fluid passageway extending therebetween; and
a cartridge recess extending into the fluid passageway at a location between the inlet and the outlet, the cartridge recess being configured to at least partially receive the valve cartridge, wherein when the valve cartridge is installed in the cartridge recess, the dilating disk valve is aligned with the fluid passageway; and
a bonnet configured to detachably attach to the valve body and at least partially cover the valve cartridge when the bonnet is attached to the valve body.

2. The valve assembly of claim 1, wherein each of the plurality of obturator elements comprises a tongue-and-groove feature.

3. The valve assembly of claim 1, wherein each of the plurality of obturator elements is in mechanical communication with the rotating ring via one or more linkages.

4. The valve assembly of claim 3, wherein the one or more linkages comprises a controlling pin and a controlling arm.

5. The valve assembly of claim 1, wherein each of the plurality of obturator elements is prevented from translationally moving by a hinge pin extending through the corresponding hinge aperture.

6. The valve assembly of claim 1, wherein the valve cartridge further comprises a shaft, wherein the shaft has (i) a first end extending from the housing of the valve cartridge and (ii) a second end disposed within the housing, the second end of the shaft comprising first gear teeth configured to mate with second gear teeth of the rotating ring.

7. The valve assembly of claim 6 further comprising a motor in mechanical communication with the first end of the shaft.

8. The valve assembly of claim 1, wherein the fluid passageway has a first central axis and the cartridge recess has a second central axis that intersects the first central axis.

9. The valve assembly of claim 8, wherein the second central axis is approximately perpendicular to the first central axis.

10. The valve assembly of claim 1, wherein the valve body further comprises:
a cartridge housing comprising the cartridge recess;
a first body portion extending between the inlet and the cartridge housing; and
a second body portion extending between cartridge housing and the outlet.

11. The valve assembly of claim 10, wherein a diameter of the fluid passageway is substantially constant along a first length of the first body portion and a second length of the second body portion.

12. The valve assembly of claim 10, wherein a diameter of the fluid passageway changes along a first length of the first body portion or a second length of the second body portion.

13. The valve assembly of claim 12, wherein the diameter of the fluid passageway gradually decreases along the first length and gradually increases along the second length when moving in a direction extending from the inlet to the outlet.

14. A valve cartridge comprising:

a housing; and a dilating disk valve at least partially disposed within the housing, the dilating disk valve comprising:

a gear mechanism comprising a rotating ring; and a plurality of obturator elements, each of the plurality of obturator elements comprising:

a top side having a substantially convex curvature;

a bottom side having a substantially concave curvature; and a sidewall comprising a control aperture and a hinge aperture, wherein the housing is configured to removably insert into a cartridge recess of a valve body.

15. The valve cartridge of claim 14, wherein each of the plurality of obturator elements comprises a tongue-and-groove feature.

16. The valve cartridge of claim 14 wherein each of the plurality of obturator elements is in mechanical communication with the rotating ring via one or more linkages.

17. The valve cartridge of claim 16, wherein the one or more linkages comprises a controlling pin and a controlling arm.

18. The valve cartridge of claim 14, wherein each of the plurality of obturator elements is prevented from translationally moving by a hinge pin extending through the corresponding hinge aperture.

19. The valve cartridge of claim 14, wherein the valve cartridge further comprises a shaft, wherein the shaft has (i) a first end extending from the housing of the valve cartridge and (ii) a second end disposed within the housing, the second end of the shaft comprising first gear teeth configured to mate with second gear teeth of the rotating ring.

* * * * *